United States Patent

Buscher

[15] 3,688,099
[45] Aug. 29, 1972

[54] AUTOMATIC CONTROL SYSTEM WITH A DIGITAL COMPUTER

[72] Inventor: Richard G. Buscher, Woodland Hills, Calif.

[73] Assignee: Lear Siegler, Inc., Santa Monica, Calif.

[22] Filed: April 28, 1971

[21] Appl. No.: 138,172

[52] U.S. Cl. ............235/153, 235/150.2, 244/77 M, 318/563, 318/564
[51] Int. Cl. ..........................G05b 1/00, G06f 15/50
[58] Field of Search ...235/153, 150.2; 318/564, 563, 318/565, 580; 244/77 M

[56] References Cited

UNITED STATES PATENTS

| | | | |
|---|---|---|---|
| 3,283,229 | 11/1966 | Lindahl | 318/580 |
| 3,454,849 | 7/1969 | Kirchhein et al. | 318/565 |
| 3,462,662 | 8/1969 | Carpenter | 318/565 |
| 3,614,401 | 10/1971 | Lode | 235/153 |

*Primary Examiner*—Charles E. Atkinson
*Attorney*—Harold L. Jackson, Stanley R. Jones, Robert M. Vargo and Eric T. S. Chung

[57] ABSTRACT

A redundant flight control system having a pair of digital computers programmed to generate a command signal responsive to the individual outputs of three sensors. Two of the sensors represent a desired parameter and a third sensor represents a different, but related parameter. The computers are programmed as follows:

1. To derive the desired parameter from the sensor representing the related parameter, to compare the three representations of the desired parameter, and to indicate a sensor fault when one of the representations deviates too much from the other two;

2. To produce a resultant signal having a standard value responsive to a test signal applied to the input of the computer and to indicate a computer fault when the resultant signal deviates from the standard value;

3. To produce from a follow-up signal an inverse model response representative of the actuator driven by the command signal, to compare this model response with a representation of the command signal stored in the computer memory, and to indicate an actuator fault when the model response deviates from the command signal representation; and 4. To compare the stored representations of the command signals of the two computers and to indicate a discrepancy therebetween.

14 Claims, 4 Drawing Figures

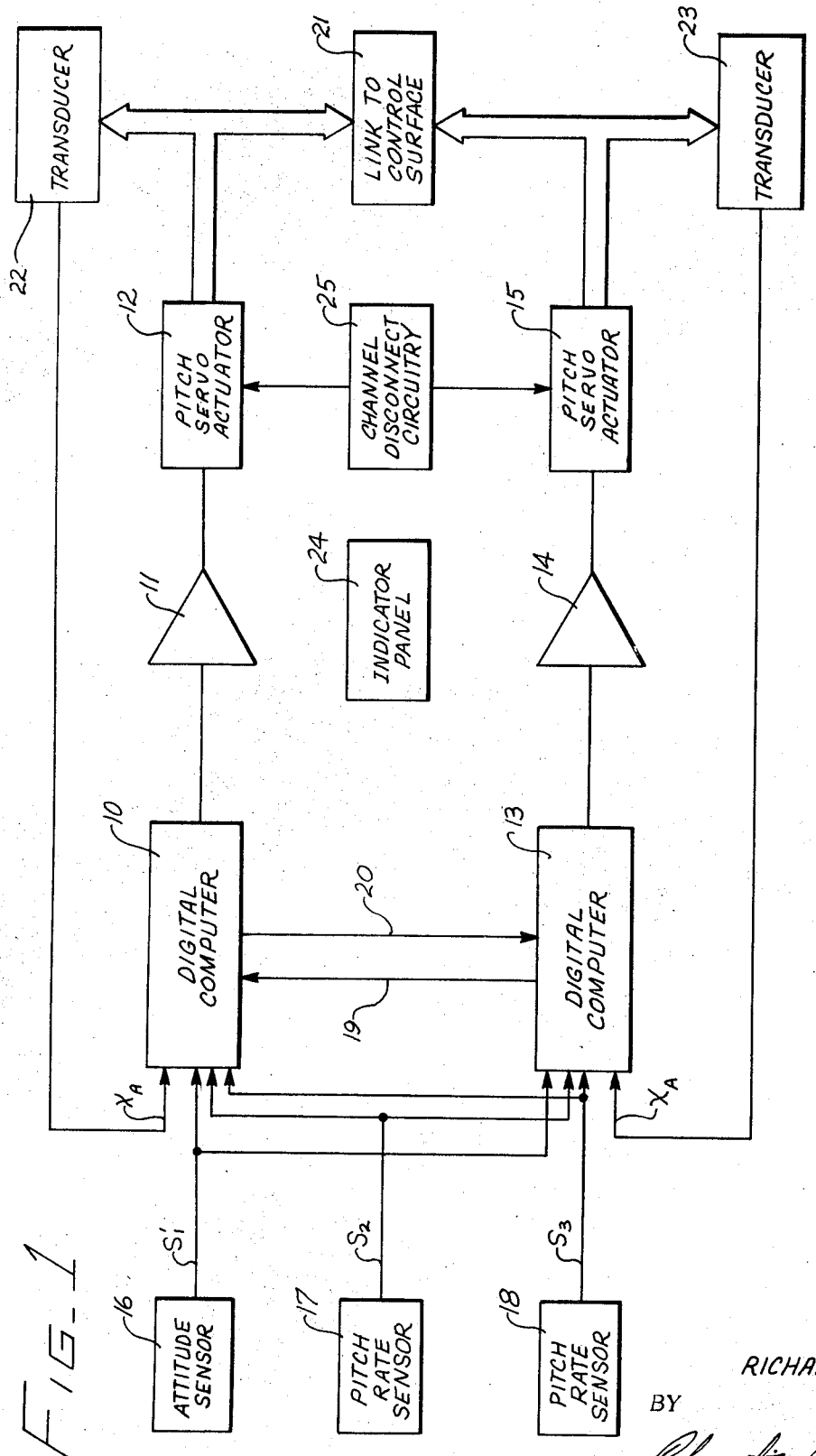
FIG_1

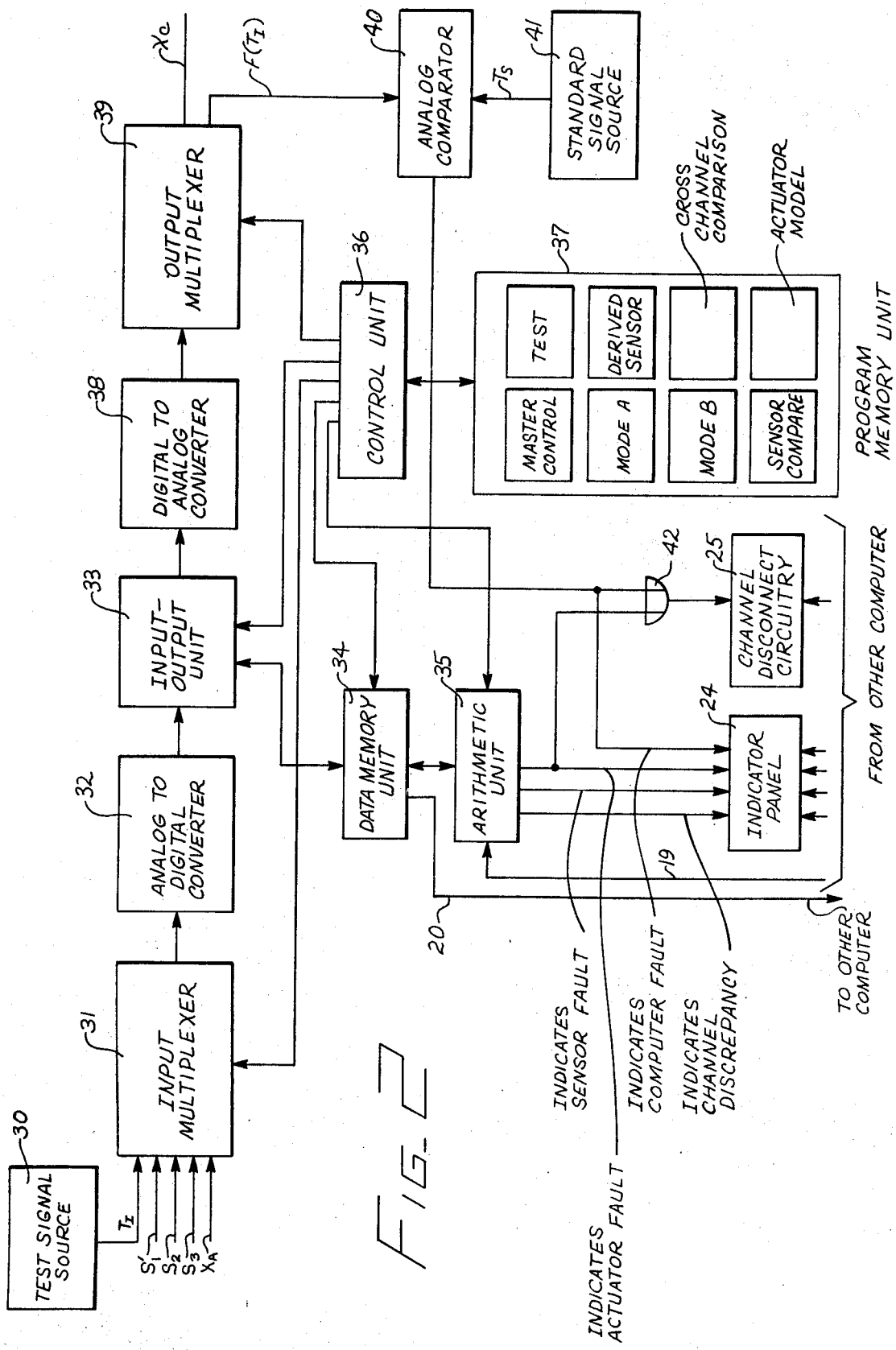

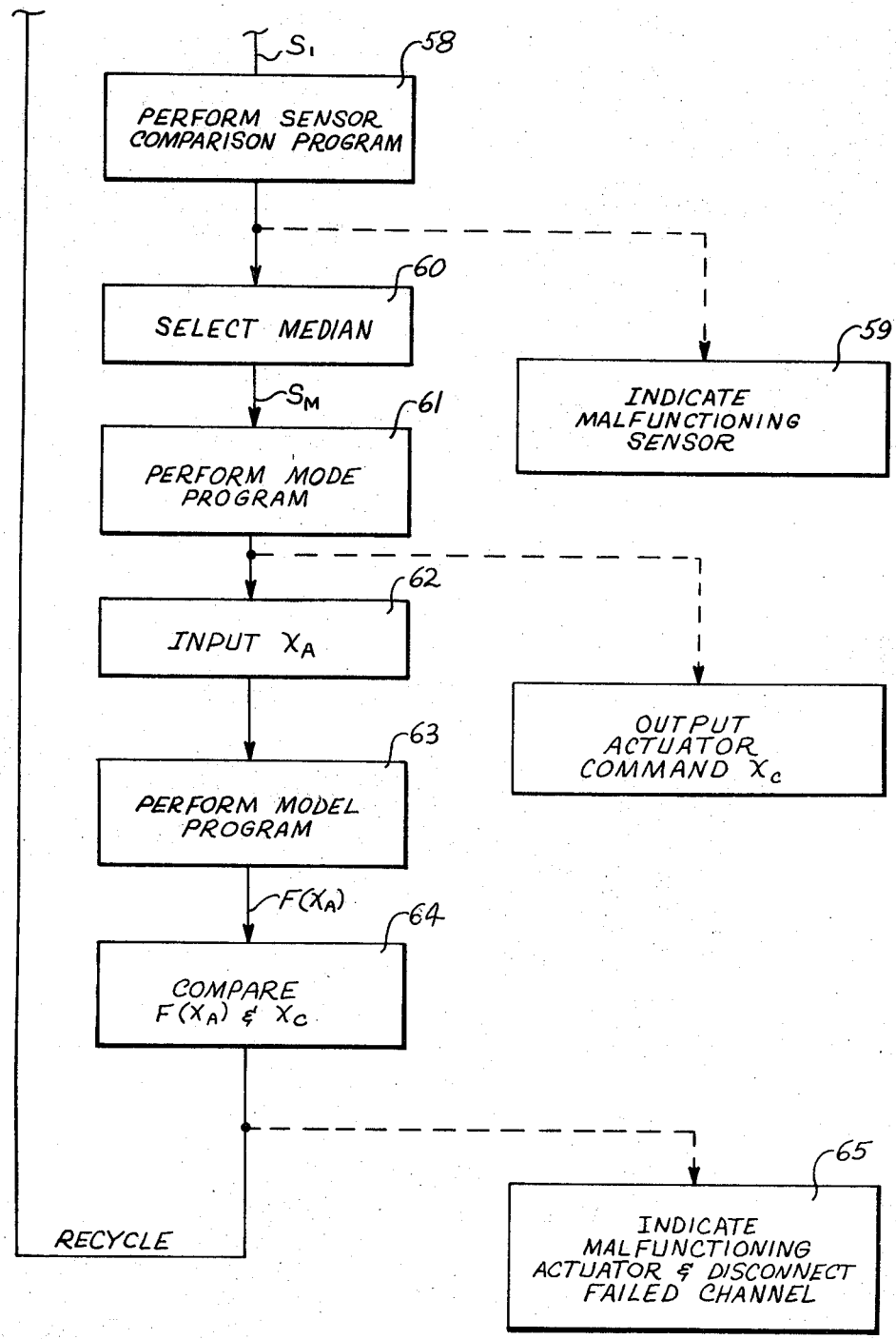

AUTOMATIC CONTROL SYSTEM WITH A DIGITAL COMPUTER

BACKGROUND OF THE INVENTION

This invention relates to the field of automatic controls and, more particularly, to a fail-safe and/or fail operational automatic flight control system that is based upon one or more digital computers.

According to common usage, a fail-safe control system is one that permits a failure to be detected so the entire system may be shut down, and a fail-operational control system is one that permits a failure to be detected and the failed part to be identified so it may be removed without shutting the system down. Automatic flight control systems are commonly designed to have a fail-safe or fail operational capability in order to improve safety and reliability. Conventionally, a fail-safe automatic flight control system has two identical channels the responses of which are compared with each other. Each channel comprises a computer that produces a command signal from sensor signals and an actuator for driving a control surface response to the command signal. When a discrepancy arises between the actuator responses, a failure in one of the channels is indicated, although which channel cannot be ascertained. Thereafter, the entire system is automatically disconnected or failure indication is given to the pilot so he may disconnect manually. Conventionally, a fail operational automatic flight control system has three or four identical channels, the responses of which are compared with each other. When a discrepancy arises among the responses, a failure in one of the channels is indicated and the failed channel can be identified by its disagreement with the responses of the remaining two or three channels. Thereafter, the failed channel is automatically disconnected from the system or identified to the pilot so he may disconnect manually while the remaining channels continue to operate. In summary, at least two channels are required for fail-safe performance and at least three channels are required for single fault, fail-operational performance.

The number of identical channels can be reduced, however, by substituting an electrical model for one of the channels. Such a model simulates the response of one of the channels. Therefore, it can be used for comparison purposes to detect a failure and identify failed channels, but, of course, cannot be used in the actual operation of the control system. One channel and a model is capable of providing fail-safe performance, while two channels and one model is capable of providing fail-operational performance.

SUMMARY OF THE INVENTION

According to the invention, a programmable digital computer is employed in a channel of a control system to generate the command signal. The programmability and time-sharing capability of the digital computer are exploited to detect failure of the control system and/or identify the failed part thereof in a manner that requires fewer channels. For example, fail-safe performance requires only one channel and single fault, fail-operational performance requires only two channels, each channel comprising a digital computer and an actuator.

In addition to being programmed to generate a command signal from a sensor signal applied to the input of the computer, the computer is also programmed to test its own performance. A test program is performed upon a test signal applied to the input of the computer and the value of the resultant signal is compared with a standard value. When the value of the resultant signal deviates from the standard value, a computer fault is indicated. In general, fail-operational performance can be achieved by $n + 1$ channels in the face of $n$ faults. The test program is designed to be sufficiently comprehensive to involve, and thus test, all the operations performed by the computer while it generates a command signal. Thus, a high degree of certainty exists that the generated command signal is accurate as long as the resultant signal of the test program is at the standard value.

According to a feature of the invention, a follow-up signal representative of the actual response of the actuator to the command signal is also applied to the input of the computer. A model program representing a model response of the actuator or its inverse is performed upon either the follow-up signal or the command signal to produce a model signal. The model signal is compared with the other signal. A discrepancy between the model signal and the other signal indicates an actuator fault.

Another feature of the invention concerns the treatment of the sensor information from which the computer generates the command signal. If there are provided two sensors that represent a desired parameter and a third sensor that represents a different but related parameter, the computer is programmed to derive the desired parameter from the sensor representing the related parameter. The three representations of the desired parameter are compared and a sensor fault is indicated when one of the representations deviates too much from the other two.

Another feature of the invention that is applicable in a fail-operational control system, i.e., a system having two identical channels, is a cross-channel comparison. Each computer is programmed to compare the command signal it generates with the command signal generated by the computer of the other channel and to indicate a discrepancy therebetween.

Any one or more of the above-described programs can be carried out by the digital computer sequentially in time sequence along with its operational program or programs from which the command signal is generated. Further, the computer can be adapted to different control systems simply by changing the programs and the same computer can be used to generate the command signal of all the modes of operation of the system. Thus, a flexible and highly reliable control system results.

BRIEF DESCRIPTION OF THE DRAWINGS

The features of a specific embodiment of the best mode contemplated of carrying out the invention are illustrated in the drawings, in which:

FIG. 1 is a block schematic diagram of a fail-operational flight control system incorporating the principles of the invention;

FIG. 2 is a block schematic diagram of one of the digital computers depicted in FIG. 1; and FIGS. 3A and 3B show a flow diagram of one exemplary cycle of the operation of the computer of FIG. 2.

DETAILED DESCRIPTION OF THE DRAWINGS

Figure 3A:
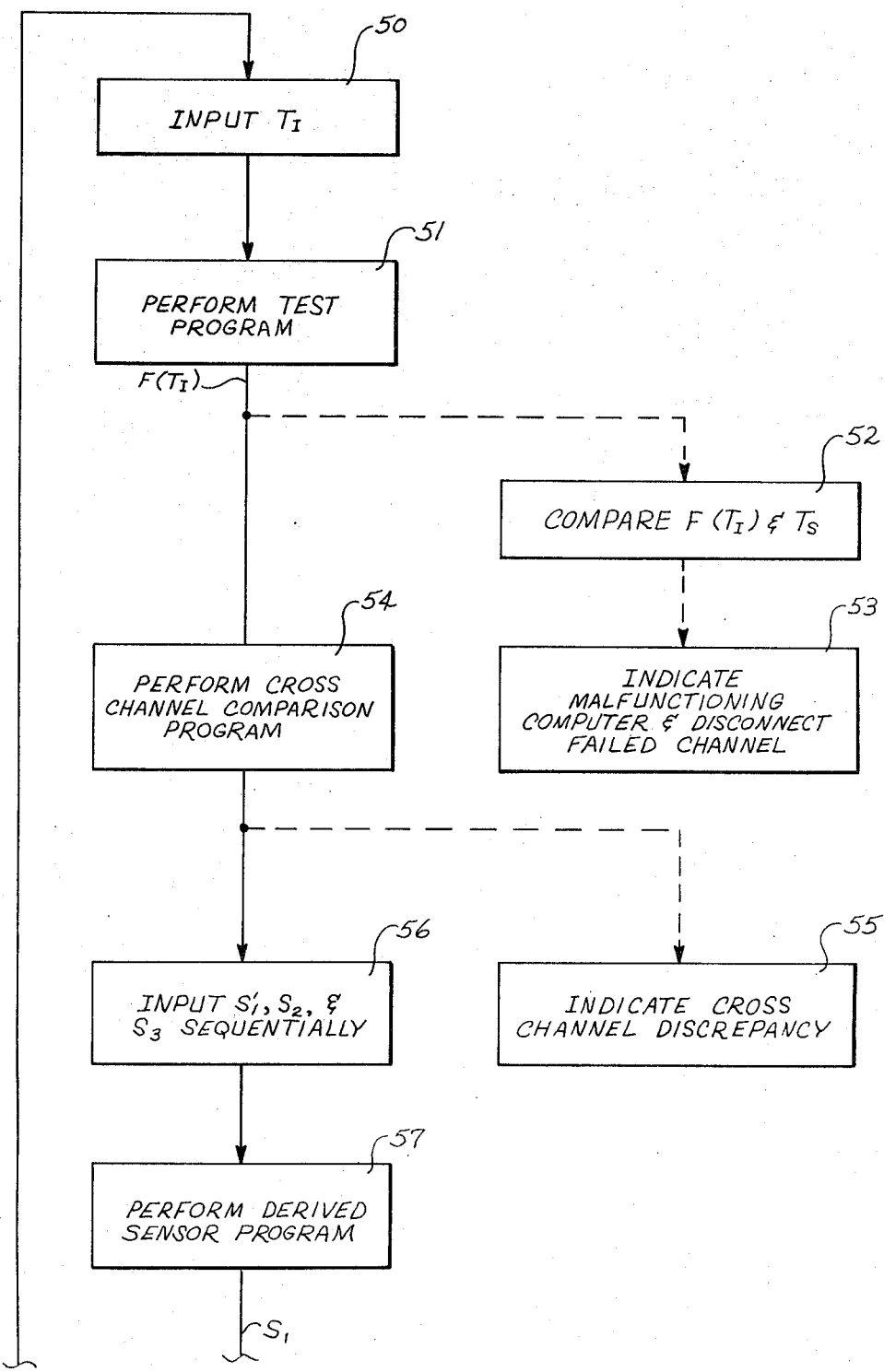

In FIG. 1, there is shown an aircraft pitch axis control system that comprises two identical channels. The single line arrows represent electrical connections and the double line arrows represent mechanical connections. One channel has a digital pitch computer 10 that is connected by an amplifier 11 to a servo actuator 12. The other channel has a digital pitch computer 13 that is coupled by an amplifier 14 to a servo actuator 15. An attitude sensor 16 that generates an electrical analog sensor signal $S'_1$ representative of the pitch attitude of the aircraft, a pitch rate sensor 17 that generates an electrical analog sensor signal $S_2$ representative of the pitch rate of the aircraft, and a pitch rate sensor 18 that generates an electrical analog sensor signal $S_3$ representative of the pitch rate of the aircraft are coupled to the respective inputs of computers 10 and 13. In actuality, sensors 16, 17 and 18 could be individual members of three sets of sensors that measure a number of parameters such as acceleration, velocity, attitude, etc. From sensor signals $S'_1$, $S_2$, and $S_3$, computers 10 and 13 produce at their respective outputs analog command signals that are coupled through amplifiers 11 and 14, respectively, to servo actuators 12 and 15, respectively. Cross-channel connections 19 and 20 between computers 10 and 13 serve to compare the generated command signals. Pitch servo actuators 12 and 15 are mechanically coupled to the pitch control surface by a link 21, such as the differential unit disclosed in U.S. Pat. No. 3,462,662, which issued Aug. 19, 1969, in the name of W. E. Carpenter. In addition, servo actuator 12 is mechanically coupled to a position transducer 22 and servo actuator 15 is mechanically coupled to a position transducer 23. Transducers 22 and 23 produce electrical analog follow-up signals $X_A$ representative of the respective positions of servo actuators 12 and 15. The outputs of transducers 22 and 23 are coupled to the respective inputs of computers 10 and 13 to enable a comparison to be made between the actual response of each servo actuator and its expected response. An indicator panel 24 designates by lamps or the like different types of system failures detected in the manner described below in connection with FIG. 2. Channel disconnect circuitry 25 disables servo actuator 12 or servo actuator 15 whenever a fault is detected in the corresponding channel in the manner described below in connection with FIG. 2, thereby removing that channel from the control system.

In FIG. 2 one of the computers of FIG. 1 is shown in detail. Sensor signals $S'_1$, $S_2$, and $S_3$, follow-up signal $X_A$, and an electrical analog test signal $T_I$ from a test signal source 30 are sequentially and repeatedly coupled by an input multiplexer 31 to an analog-to-digital converter 32. Analog-to-digital converter 32 transforms the analog signals at the input of multiplexer 31 to digital words compatible with the computer components, which comprise an input-output unit 33, a data memory unit 34, an arithmetic unit 35, a control unit 36, and a program memory unit 37. As depicted in FIG. 2, digital information is exchanged between input-output unit 33 and data memory unit 34 and between data memory unit 34 and arithmetic unit 35, under the supervision of control unit 36. A plurality of different programs designated a master control program, a test program, a mode A program, a mode B program, a derived sensor program, a cross-channel comparison program, a sensor-compare program, and an actuator model program are stored in program memory unit 37. Program memory unit could be a core memory in which the programs are temporarily stored as binary signals, a plug-board into which prewired programs are inserted, or a wired unit having permanent unchangeable programs. The term "programmable digital computer" is used in this specification in a sense to include all these possibilities, although a core memory, or the like is the most flexible. Under the supervision of the master control program, control unit 36 regulates the execution of the instructions of the other programs.

The components of the digital computer function in a standard manner to operate upon the digital words supplied to input-output unit 33 by analog-to-digital converter 32 in accordance with the programs stored in program memory unit 37 and to deliver to input-output unit 33 the digital words that represent the computations resulting from the execution of the programs. If desired, data memory unit 34 and program memory unit 37 could physically be a single memory. Input-output unit 33 is coupled by a digital-to-analog converter 38 to an output multiplexer 39. Digital-to-analog converter 38 transforms the resulting digital words to analog signals and output multiplexer 39 sequentially and repeatedly couples a command signal $X_C$ and a resultant signal $F(T_I)$ from digital-to-analog converter 38 respectively to the servo actuator for the channel (not shown in FIG. 2) and an analog comparator 40. A standard signal source 41 applies an electrical analog signal $T_S$ having a standard value with which the value of the resultant signal $F(T_I)$ is compared.

As depicted in FIG. 2, control unit 36 also regulates input multiplexer 31 and output multiplexer 39 to coordinate the application of the analog signals at the input of the computer and the transmission of the analog signals at the output of the computer with the execution of the computer programs. In other words, input multiplexer 31 successively couples each signal at its input through analog-to-digital converter 32 to input-output unit 33 at a point in the computer cycle when the program that operates upon such signal is being performed. Similarly, the results of the programs in input-output unit 33, as transformed by digital-to-analog converter 38, are coupled by output multiplexer 39 to the appropriate utilization device, i.e., either analog comparator 40 or the servo actuator.

FIG. 3 depicts the flow diagram of a typical mode of operation supervised by the master control program stored in program memory unit 37. The solid lines on the left side between blocks indicate the flow of the digital operations and monitoring functions and the dashed lines on the right side indicate the non-digital, monitoring functions. As represented by a block 50, the first step of the operating cycle is to input test signal $T_I$. Thus, responsive to control unit 36, input multiplexer 31 couples test signal source 30 through analog-to-digital converter 32 to input-output unit 33. As represented by a block 51, the next step is to perform the test program on test signal $T_I$. The particular nature of the test program depends on the hardware make-up of the computer and the nature of the mode programs performed thereby. The underlying notion is to employ a test program that involves every portion of the computer that is employed in the course of the performance of the mode program so that there is high degree of certainty that the computer is operating normally when the value of the resultant signal $F(T_I)$ is the standard value. In other words, when a known program operates upon a known signal, i.e., $T_I$, a known result will normally be obtained. As represented by a block 52, the next step is to compare the resultant signal $F(T_I)$ and a signal $T_S$ representative of the standard value. This is accomplished by analog comparator 40, which is coupled through an OR gate 42 (FIG. 2) to channel disconnect circuitry 25 and is coupled directly to indicator panel 24. Accordingly, as represented by a block 53 in FIG. 3, a failure of resultant signal to match the standard value causes analog comparator 40 to indicate a malfunctioning computer on indicator panel 24 with an appropriate lamp and to disconnect the failed channel by means of channel disconnect circuitry 25.

As represented by block 54, the next step is to perform a cross-channel comparison program. A digital word representing the value of the command signal generated each time the operational program, i.e., the mode program, is performed, is stored in the data memory unit of each computer. These digital words are compared in value by the cross-channel comparison program. As depicted in FIG. 2, the digital word representative of the command signal generated by that computer is coupled by lead 20 from data memory unit 34 to the other computer and the digital word representative of the command signal generated by the other computer is coupled by lead 19 to arithmetic unit 35 for comparison with the digital word representative of the command signal generated by the computer shown in FIG. 2. As represented by a block 55, the cross-channel comparison program indicates a cross-channel discrepancy when the compared digital words representative of the command signals disagree. Arithmetic unit 35 (FIG. 2) is coupled to indicator panel 24 to provide an indication of this channel discrepancy with an appropriate lamp.

As represented by a block 56, the next step is to input sensor signals $S'_1$, $S_2$ and $S_3$ sequentially. The digital words representing these sensor signals are stored in data memory unit 34 pending their processing by the computer. As represented by a block 57, the next step is to perform the derived sensor program on the digital word representing sensor signal $S'_1$, thereby producing a digital word $S_1$ that represents the derived pitch rate of the aircraft. Thus, there are stored in data memory unit 34, at this point in the cycle, digital words representative of three sensor signals, $S_1$, $S_2$ and $S_3$, all representative of the same parameter. As represented by a block 58, the next step is to perform the sensor comparison program. If one of sensor signals $S_1$, $S_2$, and $S_3$ differs from the other two by an amount greater than some predetermined margin, the sensor comparison program indicates a malfunctioning sensor, as represented by a block 59. Arithmetic unit 35 (FIG. 2) is coupled to indicator panel 24 to give a malfunctioning sensor indication with an appropriate lamp thereon.

As represented by a block 60, the next step is to select from among sensor signals $S_1$, $S_2$, and $S_3$ the sensor signal $S_M$ with the median value for performance of the mode, i.e., operational program, as represented by a block 61. In FIG. 2, the function of block 60 is represented as part of the mode program. The computer selects the median digital sensor word stored in data memory unit 34 and the instructions of the mode program operate upon this word to produce the command signal. The mode programs corresponding to all the different automatic flight control modes of the aircraft are stored in program memory unit 37 at the same time. One of these mode programs is chosen for execution, depending upon the mode in which the aircraft is to fly. The digital word representing the command signal is coupled from input-output unit 33 to digital-to-analog converter 38, where it is transformed into an analog command signal $X_C$. This command signal is routed through output multiplexer 39 to the servo actuator for the channel. The digital representation of the command signal is also stored in data memory unit 34.

As represented by a block 62, the next step is to input follow-up signal $X_A$ through multiplexer 31 and analog-to-digital converter 32 to input-output unit 33. As represented by a block 63, the computer then performs the model program with respect to follow-up signal $X_A$ and produces a digital word $F(X_A)$ that represents the inverse of a model response of the servo actuator to which the command signal is applied. If the servo actuator is functioning normally, a model of the inverse response to the servo actuator should produce from the follow-up signal $X_A$ a signal identical to the command signal $X_C$. Thus, the digital word $F(X_Z)$ and the digital representation of the command signal stored in data memory unit 34 are coupled to arithmetic unit 35 where they are compared, as represented by a block 64. As represented by a block 65, arithmetic unit 35 indicates a malfunctioning actuator and disconnects the failed channel when the two compared digital words disagree. Arithmetic unit 35 (FIG. 2) is coupled directly to indicator panel 24 to indicate a malfunctioning actuator with an appropriate lamp and through OR gate 42 to channel disconnect circuitry 25 to disconnect the channel of which the malfunctioning actuator is a part. The computer then recycles and repeats the steps represented by blocks 50 through 65.

As an alternative to the particular series of steps shown in FIGS. 3A and 3B, the steps could be arranged in a different order or some of the steps could be repeated several times during each complete cycle; i.e., the flow diagram could have inner loops.

The test program preferably comprises a series of instructions that performs each of the computer operations once. Typical computer operations are add, subtract, multiply, divide, shift right, shift left, transfer to data memory, transfer from data memory, and compare. All the computations of a computer are performed by a relatively small number of computer operations; e.g., 10 to 50. Therefore, since each operation must only be performed once by the test program to give a reliable indication of the computer performance, the test program is executed in a very small fraction of the operating cycle shown in FIGS. 3A and 3B.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, instead of performing a program in block 63 that is a model of the inverse response of the actuator on the follow-up signal, a program that is the response "per se" of the actuator could be performed on the digital representation of the command signal. The result is then compared with the digital representation of the follow-up signal. Further, digital sensors or sets of sensors could be employed instead of analog sensors. In such case, the sensor outputs could be coupled directly to input-output unit 33. The principles illustrated in connection with a pitch axis control system could, and preferably are, also used to implement the yaw axis and roll axis control systems of the aircraft. Most advantageously, the same digital computer or computers are programmed to generate the command signals and detect and identify faults for all three axes of control. In general, if the control system is to have the capability of functioning after $n$ faults have occurred, $n + 1$ parallel channels are provided.

What is claimed is:

1. A fail-safe automatic control system comprising:
an element to be controlled;
means for sensing a parameter related to the control exercised over the element, the sensing means generating an electrical sensor signal representative of the sensed parameter;
a programmable digital computer having an input and an output;
means for coupling an electrical test signal to the input of the computer;
means for coupling the sensor signal to the input of the computer;
the computer being programmed to perform a test program that produces a resultant signal at the output of the computer responsive to the test signal at the input of the computer and an operational program that produces a command signal at the output of the computer responsive to the sensor signal at the input of the computer;
means responsive to the command signal at the output of the computer for actuating the element so as to change the sensed parameter;
means for comparing the value of the resultant signal produced responsive to the test signal with a standard value; and
means responsive to the comparing means for indicating a fault of the computer test.

2. The control system of claim 1, additionally comprising: means for generating an electrical follow-up signal representative of the actual response of the element to the actuating means; means for coupling the follow-up signal to the input of the computer; and means for indicating a fault of the actuating means; the computer being additionally programmed to perform a model program that produces a model signal representing the inverse of the response of the actuating means from the follow-up signal at the input of the computer, stores the command signal in the computer memory, compares the model signal with the command signal, and actuates the fault indicating means of the actuating means when a discrepancy exists between the model and command signals.

3. The control system of claim 2, additionally comprising: means for indicating a fault of the sensing means, the sensing means comprising at least three sensors that generate individual electrical sensor signals and the computer being additionally programmed to perform a sensor comparison program that actuates the fault indicating means of the sensing means when one of the individual sensor signals deviates from the remaining two individual sensor signals by a predetermined amount.

4. The control system of claim 3, in which one of the individual sensor signals represents a parameter different from but related to the parameter represented by the remaining individual sensor signals and the computer is programmed to perform a derived sensor program that produces a derived sensor signal representative of the principle parameter responsive to the different sensor signal, the sensor comparison program operating upon the derived sensor signal and the remaining sensor signals.

5. The control system of claim 4, additionally comprising another programmable digital computer having an input and an output, the other computer being programmed to perform a test program that produces a resultant signal at the output of the computer responsive to the test signal at the input of the computer and an operational program that produces a command signal at the output of the computer responsive to the sensor signal at the input of the computer; means for indicating a discrepancy between the command signals generated pursuant to the operational programs of the computers, the computers being additionally programmed to perform a cross-channel comparison program that actuates the discrepancy indicating means when the command signals stored in the respective computer memories deviate.

6. The control system of claim 1, additionally comprising: means for generating an electrical follow-up signal representative of the actual response of the element to the actuating means; means for coupling the follow-up signal to the input of the computer; and means for indicating a fault of the actuating means; the computer being additionally programmed to perform a model program that produces a model response of the actuating means, compares the model response with the actual response of the actuating means, and actuates the fault indicating means of the actuating means when a discrepancy exists between the model and actual responses.

7. The control system of claim 1, additionally comprising means for indicating a fault of the sensing means, the sensing means comprising at least three sensors that generate individual electrical sensor signals and the computer being additionally programmed to perform a sensor comparison program that actuates the fault indicating means of the sensing means when one of the individual sensor signals deviates from the remaining two individual sensor signals by a predetermined amount.

8. The control system of claim 1, in which the sensing means comprises at least three sensors that generate individual electrical sensor signals, one of the individual sensor signals representing a parameter different from but related to the parameter represented by the remaining individual sensor signals and the computer being programmed to perform a derived sensor program that produces a derived sensor signal representative of the principal parameter responsive to the different sensor signal.

9. The control system of claim 1, additionally comprising another programmable digital computer having an input and an output, the other computer being programmed to perform a test program that produces a resultant signal at the output of the computer responsive to the test signal at the input of the computer and an operational program that produces a command signal at the output of the computer responsive to the sensor signal at the input of the computer; means for indicating a discrepancy between the command signals generated pursuant to the operational programs of the computers, the computers being additionally programmed to perform a cross-channel comparison program that actuates the discrepancy indicating means when the command signals stored in the respective computer memories deviate.

10. A fail-safe automatic control system comprising:
an element to be controlled;
means for sensing a parameter related to the control exercised over the element, the sensing means generating an electrical sensor signal representative of the sensed parameter;
a first programmable digital computer having an input and an output;
a second programmable digital computer having an input and an output;
means for coupling an electrical test signal to the inputs of the first and second computers;
means for coupling the sensor signal to the inputs of the first and second computers;
the first and second computers each being programmed to perform a test program that produces a resultant signal at the outputs of the computers responsive to the test signal at the inputs of the computers and an operational program that produces a command signal at the outputs of the computers responsive to the sensor signal at the inputs of the computers;
means responsive to the command signal at the outputs of the computers for actuating the element so as to change the sensed parameter;
means for comparing the value of the resultant signal produced by each computer responsive to the test signal with a standard value; and
means responsive to the comparing means for indicating a fault of the computer test.

11. The control system of claim 10, additionally comprising: means for generating an electrical follow-up signal representative of the actual response of the element to the actuating means; means for coupling the follow-up signal to the inputs of the first and second computers; and means for indicating a fault of the actuating means; the first and second computers each being additionally programmed to perform a model program that produces a model signal representing the inverse of the response of the actuating means from the follow-up signal at the inputs of the computers, stores the command signal in the computer memory, compares the model signal with the command signal, and actuates the fault indicating means of the actuating means when a discrepancy exists between the model and command signals.

12. The control system of claim 11, additionally comprising: means for indicating a fault of the sensing means, the sensing means comprising at least three sensors that generate individual electrical sensor signals and the first and second computers each being additionally programmed to perform a sensor comparison program that actuates the fault indicating means of the sensing means when one of the individual sensor signals deviates from the remaining two individual sensor signals by a predetermined amount.

13. The control system of claim 12, in which one of the individual sensor signals represents a parameter different from but related to the parameter represented by the remaining individual sensor signals and the first and second computers are each programmed to perform a derived sensor program that produces a derived sensor signal representative of the principal parameter responsive to the different sensor signal, the sensor comparison program operating upon the derived sensor signal and the remaining sensor signals.

14. The control system of claim 13, additionally comprising means for indicating a discrepancy between the command signals generated pursuant to the operational programs of the first and second computers, the first and second computers each being additionally programmed to perform a cross-channel comparison program that actuates the command signal discrepancy indicating means when the command signals stores in the respective computer memories deviate.

* * * * *